United States Patent [19]
Coldren et al.

[11] Patent Number: 4,707,647
[45] Date of Patent: Nov. 17, 1987

[54] GRAY SCALE VISION METHOD AND SYSTEM UTILIZING SAME

[75] Inventors: Bruce E. Coldren, Troy; Kenneth W. Krause, Rochester, both of Mich.

[73] Assignee: GMF Robotics Corporation, Auburn Hills, Mich.

[21] Appl. No.: 864,416

[22] Filed: May 19, 1986

[51] Int. Cl.⁴ .................... G05B 19/18; G06F 15/46
[52] U.S. Cl. ............................ 318/568; 364/513; 364/478; 382/28; 901/47; 318/640
[58] Field of Search ............ 364/513, 474, 478; 318/568, 640, 480; 358/903, 101, 139; 356/390; 382/28, 15, 14, 16, 18, 19, 22, 25, 42; 901/46, 47

[56] References Cited

U.S. PATENT DOCUMENTS

| | | | |
|---|---|---|---|
| 4,402,053 | 8/1983 | Kelley | 364/513 |
| 4,412,293 | 10/1983 | Kelley | 364/513 |
| 4,525,858 | 6/1985 | Cline | 364/522 |
| 4,539,703 | 9/1985 | Clearman | 364/513 |
| 4,601,055 | 7/1986 | Kent | 364/900 |
| 4,613,269 | 9/1986 | Wilder | 364/513 |
| 4,628,464 | 12/1986 | McConnell | 364/513 |

*Primary Examiner*—William M. Shoop, Jr.
*Assistant Examiner*—Patrick C. Keane
*Attorney, Agent, or Firm*—Brooks & Kushman

[57] ABSTRACT

A method and system are provided for automatically locating an object at a vision station by performing an edge-detecting algorithm on at least a portion of the gray-scale digitized image of the object. Preferably, the algorithm comprises an implementation of the Hough transform which includes the iterative application of a direction-sensitive, edge-detecting convolution to the digital image. Each convolution is applied with a different convolution mask or filter, each of which is calculated to give maximum response to an edge of the object in a different direction. The method and system have the ability to extract edges from low contrast images. Also, preferably, a systolic array processor applies the convolutions. The implementation of the Hough transform also includes the steps of shifting the resulting edge-enhanced images by certain amounts in the horizontal and vertical directions, summing the shifted images together into an accumulator buffer to obtain an accumulator image and detecting the maximum response in the accumulator image which corresponds to the location of an edge. If the object to be found is permitted to rotate, at least one other feature, such as another edge, must be located in order to specify the location and orientation of the object. The location of the object when correlated with the nominal position of the object at the vision station provides the position and attitude of the object. The resultant data may be subsequently transformed into the coordinate frame of a peripheral device, such as a robot, programmable controller, numerical controlled machine, etc. for subsequent use by a controller of the peripheral device.

13 Claims, 11 Drawing Figures

VISION PROGRAM (RUN-TIME MODULE)

TRAINING SEQUENCE

GRAY SCALE VISION METHOD AND SYSTEM UTILIZING SAME

CROSS-REFERENCE TO RELATED APPLICATION

This invention relates to and hereby incorporates by reference, United States patent application entitled "Method and System for Automatically Determining the Position and Attitude of an Object", filed June 4, 1985 and having U.S. Ser. No. 741,123.

TECHNICAL FIELD

This invention relates in general to machine vision methods and systems and, in particular, to gray scale machine vision methods and systems utilizing same.

BACKGROUND ART

The potential value within the manufacturing industry for machine vision systems with the flexibility and acuity of human sight is widely recognized. Unfortunately, the development of a general purpose vision technology has not been as successful as hoped. No single technology has proven to be capable of handling a significant spectrum of applications. Most available systems function only within selected market niches and perform disappointingly elsewhere.

The machine vision industry has been involved for the last 10 years in one continuing struggle: How to deal with the data in the time available. A vision system works with a digital representation of the scene under investigation. The scene is digitized into an array of numbers which is roughly 256 data elements square. Each 8 bit pixel (picture data element) represents the intensity of the reflected light (256 levels) at each point in the scene. This array of 65,536 numbers is the basic data structure which must be processed by all vision systems to obtain information from the observed scene.

The objective for any vision system is to process the pixels in the image array in such a manner as to separate the object of interest from the background and the noise. Difficulty arises when a classic serial computer is applied to doing operations on such a large block of data. Most popular 16 to 32 bit micro-computers require 10 to 15 seconds to perform a simple noise reducing filter operation. This amount of processing time is totally unacceptable for most industrial tasks. As a result, a major objective of those who have sought to deal with industrial vision problems has been to reduce or simplify the image data.

The industry to date has been dominated by 3 basic schemes: binary processing, structured light and correlation. Each method illustrates an approach to reducing the data.

Binary Vision

The most popular image processing method deals with binary images. A binary image can be created by making the assumption that the object and the background can be easily separated by the intensity of their respective reflected light. If the distribution of intensities is of the proper form (i.e. bimodal), a threshold can be selected such that all pixels above the threshold (background) are given a 1 and all below (object) a zero. Binary imaging accomplishes a data reduction of from 8 bits to one bit per pixel. Some systems do a small amount of gray level calculation to determine the best threshold setting for a given picture. This provides a limited amount of compensation for changes in overall lighting.

Most commercial vision systems are based on the binary segmentation algorithms originally developed at SRI International. As the image is scanned, geometric measurements are computed for each individually connection region of ones or zeroes. Information is generated about each region such as area, perimeter, centroid and axes of inertia. This straightforward processing on streams of binary data lends itself to efficient hardware implementation and, consequently, fairly fast processing.

Difficulty arises when these systems are utilized in an industrial environment. Normally, industrial situations are characterized by images that have gray parts on gray backgrounds. Finding a threshold which will reliably separate the object from the background is extremely difficult and not always possible. Much creative development has been done is lighting techniques to attempt to extend the binary approach into such application areas. This effort is expensive and in many cases, does not generate systems of the desired industrial reliability.

Structured Light

An interesting alternative approach is to project a pattern of light usually a laser line) onto the object in question. This bright line of light provides excellent contrast and an easily recognized feature. By projecting the laser at an angle, the displacement of each point on the line is made proportional to the depth of the object at that point. The shape of the line provides additional data about the curvature and edges of the object cut by the line.

Structured light has been effectively applied in the field of measurement. Extremely large systems employing hundreds of projector-sensor combinations are used for gauging automobile bodies. Scanning systems mounted on precision tables have proven effective for contour measurement of turbine blades and other critical contours.

Unfortunately, structured light has its limitations. The single line of light which reduces the data so effectively also severely limits the information content of the image. If, for example, the user wants to determine the presence or absence of several holes, or the straightness of a line, additional data must come from additional images. Efforts to scan the laser line and obtain more data result in a significantly increased computational requirement. The rotating mirrors necessary for laser scanning have also not shown themselves to be industrially viable. Therefore, for the general case of processing pictures of stationary objects, structured light has proven to be of limited usefulness.

Correlation

A third processing method draws its origin from military work in target tracking. In correlation, a section of the test image is compared with a template of the sought feature (a window or subset of the original image). A difference number is calculated which represents the qualtity of the match. In operation, a correlation system scans a scene where the feature is to be found by successive application of the template at each point on the image. The surrounding pixels are compared to the template and a difference number calculated. The point on the image where the minimum difference number occurs is presumed to be the location of the feature sought. The matching is inherently rotationally sensitive. Some systems add additional rotated templates to permit some angle offset of the sought feature.

This approach has been very effective in the semiconductor industry where complex patterns on the surface of an integrated circuit form ideal images for correlation. Hundreds of systems have been sold for locating IC chips prior to automated processing.

Correlation has two limiting characteristics. First the image to be processed must contain a large number of contrast transitions to permit the build-up of accurate statistics about the quality of the match. A piece of sheet metal with one hole resting on another piece of metal simply does not have enough features to make a correlation system effective. Secondly, the only output of the system is a single quality of match number much like a "go or no-go" gauge. Finer inspection for continuity or measurement requires the application of different technologies.

Niche Technologies

The inherent limitations of the technologies described above illustrate the reason for the rise of niche vision systems. The applications where each technology is effective have multiplied. Applications outside the technology niches have been plaqued by high application engineering costs and/or limited application. Attempts are usually made to generate artificial situations that match the constraints of the technology employed. Determining the right technology for a given job is no small task. It requires an understanding of all of the available approaches, the product, the surrounding processes and the nature of the specific manufacturing environment in which the system is to operate. Needless to say, such an accumulation of skills is rarely found in one organization. Process engineers are faced with the prospect of having a system from one manufacturer at the beginning of a line for inspection, another in the middle for gauging and a third at the end for object location prior to material handling. Each system obtained from a different manufacturer has a different underlying technology and different parts and service requirements.

Industrial Application Needs for Vision Systems

Vision systems offer immediate advantages in reducing tooling and fixture costs. Precise part location in dunnage is no longer a necessity if part position can be determined by the vision system. Machine vision also makes possible inspection tasks such as dimensional verification and defect inspection. Vision systems can also provide more increased accuracy and precision than many other methods in automation. This added accuracy, coupled with precision robots, can be used to accomplish tasks which are presently too complex or cost-prohibitive.

Robots are used in a wide variety of applications in industry such as painting, spot-welding, and sealing. In the mechanical assembly industry, robots are used for palletizing/depalletizing parts and unloading parts from trays for assembly operations. In application areas where the capabilities of the traditional "blind" robot fall short, machine vision becomes an integral part of the robot system to assist in end effector guidance. The total-integrated, visually-guided robot system results in enhanced manufacturing productivity, improved quality, reduced fixturing costs, and the ability to perform additional tasks, such as parts inspection which cannot be achieved with conventional robot systems.

Applications of machine vision in robotic systems have not all been "success" stories. Many plant engineers still face the formidable task of interfacing vision systems to robots and devote major engineering effort to achieve a workable illumination environment. Though vision systems have often worked well with robots, there is still a broad class of applications which have been marginally operational and which could be better handled with different approaches. There are also many potentially successful vision-robot applications yet to be explored.

Many industrial robotic applications require the accurate positional location of identical components within a finite work area. Typical examples might be the loading or unloading of automotive parts from parts trays, the picking up of apart which has been loosely positioned by a parts feeder, or the identification and location of a part which has been cycled into a work cell for a robotic manufacturing operation. Experience has shown that the essential problem in many robotic applications is the location of a rigid body which is constrained to movement within a plane. In these two-dimensional cases, the position of the rigid body is completely specified by only three degrees of freedom: The body is only free to slide in the two planar dimensions, and to rotate about an axis perpendicular to the plane.

In order for computer vision to operate successfully in the industrial environment, many stringent operating requirements must be considered. A successful vision system must operate reliably under varying conditions, such as changes in illumination levels and color conditions of the part. The system should not be dependent on complex lighting schemes. In critical applications, redundancy must be designed in to prevent failures and reduce down time.

Vision image processing cannot take a major portion of the cycle time in robotic applications. Typically, for a manufacturing operation with a twenty second cycle time, no more than two seconds is possible for vision processing.

The vision system must take a minimum of time and effort to install, maintain and operate. The time needed to calibrate the vision system itself and to calibrate the vision system to a robot must be kept to a minimum. If calibration fixtures are used, they must also be kept simple, inexpensive, and compact.

Finally, the ultimate aim of the system is still to improve manufacturing productivity and provide a cost-effective solution to the manufacturing process.

Gray Scale Vision

Full gray scale processing ststems hold the promise of a more acceptable approach to solving industrial vision problems. In 1983 hardware began to emerge that made it possible to cost-effectively process gray scale data in times that are acceptable for industrial problem solving.

The class of high speed hardware called array processors has long been considered the answer for situations involving large amounts of data, such as in full gray scale processing. Generally visualized as a matrix of computers, an array processor increases speed by the massively parallel nature of its architecture. Problems can be broken down into components and each component sent to a separate processing node. Growth of array processors has been slow because of the physical size and cost of conventional processing nodes and the complexity of communications between processors.

One set of array processors particularly applicable to image processing operates in the SIMD mode. A SIMD mode processor runs a Single Instruction on Multiple Data streams. SIMD mode is appropriate for image processing since typically the objective is to perform a particular operation on an entire image. Unfortunately, building such a system with some 65,000 processors, is beyond today's technology.

Another hardware architecture which frequently operates in SIMD mode makes extensive use of pipelined hardware. In this approach the successive steps for processing each element of data are implemented in a separate piece of hardware. If the process requires eight successive operations to complete, then the pipe is constructed of eight successive stages of processing. The first data element entering the processor completes the first stage of processing and enters the second stage, as the second element is clocked into the first stage. This process continues until each stage of the pipeline is working on a different element of the data stream. The first element of data processed emerges from the end of the pipe in the normal processing time. The second element of data emerges ⅛th of the time later and so on until the data stream is exhausted.

In 1979-1980 H. T. Kung of Carnegie Mellon University described a simplified though restricted, form of array processor called the systolic array. The systolic array design can be used to further adapt pipelines and SIMD hardware approaches for fast image processing. Since a special purpose processor typically receives data and returns its results to a more standard host, I/O processes significantly affect overall performance.

The concept involved in systolic arrays is that of data moving smoothly and rhythmically through the hardware. Each data element is accessed only once and proceeds through the hardware until all the necessary computations required on that element have been performed. This architecture effectively adapts the concepts of array and pipeline processors to the realities of data flow within present day computer systems.

The earliest use of an architecture similar to systolic arrays came from the activities of the Environmental Research Institute of Michigan. The process was developed to speed the analysis of satellite radar images. Cytocomputer architecture was developed from this work and utilizes the concept of nearest neighborhood processing.

In its early implementations, a 3×3 matrix of pixels was examined to determine the appropriate value for the center pixel. The data drawn from memory for processing resides in a large shift register. During each cycle, the data moves up one step in the register and a processed output value for the new center pixel emerges from the special hardware. In the Cytocomputer, successive processing stages are linked together to permit a sequence of different operations to be executed in turn. This flowing of data through parallel processing stages is similar to systolic processing.

Gray Scale Algorithms

Today's systolic processors provide numerous functions which are used to analyze the information inside an image such as by utilizing image processing convolutions. These operators allow the application of filters to the image to take away noise and smooth the data. Edge detecting convolutions deal with patterns of increasing and decreasing intensity (gradients) generally found at the edges of objects. Each pixel and its neighborhood pixels are subjected to an arithmetic operation that enhances edge features of the image.

The U.S. patent to Rossol et al No. 4,105,925 discloses an optical object locator which determines the position and orientation of an object on a conveyor. Two planes of light intersect at a single transfer slide on the conveyor surface. The method assumes a constant viewing distance and perspective.

U.S. patents to Blanchard et al U.S. Pat. No. 4,618,742, Michaud et al U.S. Pat. No. 3,804,270, Birk et al U.S. Pat. No. 4,146,924, Pryor et al U.S. Pat. No. 4,373,804 and Masaki U.S. Pat. No. 4,380,696 disclose machine vision systems which provide visual data which is subsequently processed and input into a form utilized to alter the preprogrammed path of a peripheral device, such as a robot, so that the device can perform work on an object.

DISCLOSURE OF THE INVENTION

An object of the present invention is to provide an improved method and system to automatically locate an object in a quick and accurate fashion by identifying and locating at least one specific geometric feature of the object such as an edge, a hole, an ellipse, an arc or a line.

Another object of the present invention is to provide an improved method and system for automatically determining the position and orientation of an object is rapid fashion from located faetures wherein ambient light conditions are tolerated without significantly degrading performance.

Still another object of the present invention is to provide a method and system for automatically generating information from the position ad orientation of an object to permit a peripheral device, such as a robot, to compensate for any movement of the object from a nominal position and orientation.

Yet still another object of the present invention is to provide a method and system for automatically determining the position of an object in a factory environment without special lighting, such as structured lighting and without the need to use a specially constructed camera.

In carrying out the above objects and other objects of the present invention, a method is provided for automatically locating an object at a vision station. The method includes the steps of generating reference data relating to at least one feature of an ideal object, and generating a gray-scale digital image containing the object to be located at the vision station. The method further includes the step of performing an edge detecting algorithm with the reference data and at least a portion of the digital image to locate the feature within the digital image.

In one embodiment, the method is utilized to provide offset data for use by a programmed robot controller to enable the robot controlled by the controller to move to the object. The offset data is the difference between the actual and nominal positions of the body at the vision station. When utilized in this fashion, the method further comprises the additional steps of generating calibration data relating the camera to the coordinate frame of the robot, correlating the location of the feature within the digital image to an offset of the object from the camera, and transforming the offset of the object from the camera to the robot frame.

In order to completely determine the x and y offsets of the object in the image plane, at least two edge points or edge segments with different orientations are required in the reference data. Consequently, preferably, the method utilizes reference data which includes at least two edge points, one on each of a pair of non-parallel edge segments of the ideal object. The reference data and the digital image are processed together to obtain an accumulator image. The processing step includes the step of performing an edge detecting convolution on at least a portion of the digital image for each edge point. Once the location of at least one localized bright region in the accumulator image is determined, the location of the region corresponding to the location of one of the features within the digital image is found. To determine orientation, the algorithm must be performed with two different features of the object.

Also, preferably, the reference data includes directional data for each of the edge points and the processing step includes the step of shifting the convolved data by an amount and in a direction related to the directional data for each of said edge points to obtain a shifted image. The shifted convolved data is summed to obtain the accumulator image. Finally, the location of the feature or features within the digital image are correlated with the offset of the object from the camera.

Further in carrying out the above objects and other objects of the present invention, a system is provided for carrying out each of the above steps. The system includes a television camera for generating the gray scale digital image.

Also, the system may be used to automatically provide offset data to a peripheral device such as a programmed robot controller to enable a robot controlled by the controller to move to the object even if the object has moved from its original position and/or orientation. When utilized with a programmed robot controller, the system further comprises means for transforming the offset of the object from the camera into the coordinate frame of the robot.

The advantages of the above-described method and system are numerous. For example, such gray scale vision processing is insensitive to ambient lighting and does not require highly specialized lighting. Also, the processing is insensitive to background and object color and surface texture variations. The gray scale vision processing does not require that the object design be modified in order to conform to vision system requirements.

The method and system can be used to identify part styles and accept/reject inspection thresholds can be selectively checked. Tooling costs can be reduced and retooling programming is relatively easy. Furthermore, industrial standard television cameras can be quickly replaced and automatically recalibrated in such machine vision method and system.

Other advantages of the present invention will be readily appreciated as the same becomes better understood by reference to the following detailed description when considered in connection with the accompanying drawings.

BEST MODE FOR CARRYING OUT THE INVENTION

Figure 1:
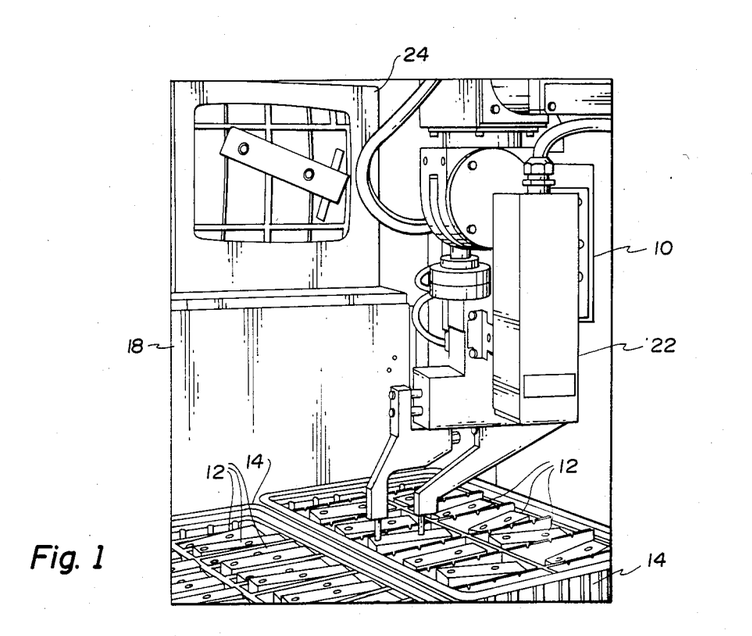
FIG. 1 is a framed perspective view illustrating the operation and system of the present invention with respect to the loading and/or unloading of parts from part trays.

Referring to FIG. 1, there is illustrated a robot 10 which is guided to move to an object by a gray scale machine vision system constructed and operated in accordance with the present invention. However, it is to be understood that the robot 10 or other peripheral device is not required for operation of the present invention.

The vision system as described hereinafter is not only "robust" (i.e. relatively unaffected by changes in lighting, object position and/or reflectivity of the viewed object) but also flexible. By being flexible, the system can readily adapt to changes of its various components and also to object design variations.

Use of the present method and system not only results in high productivity, but also improved quality. More specfically, as illustrated in the example of FIG. 1, the method and system provide accurate positional information relating to an object located within a finite work envelope of the robot 10. In the example shown, the objects are automotive parts 12 which are to be loaded or unloaded from trays 14.

Other uses of the machine vision system are, for example, picking up of a part which has been loosely positioned by a parts feeder and locating a part which has been cycled into a work cell for a robotic manufacturing operation. In each of the examples, the method and system are capable of locating a rigid object which is constrained to move within a plane so that the rigid object is completely specified by only three degrees of freedom (i.e. the object is only free to slide in the two planar dimensions and to rotate about an axis perpendicular to the plane).

Figures 3, 4:
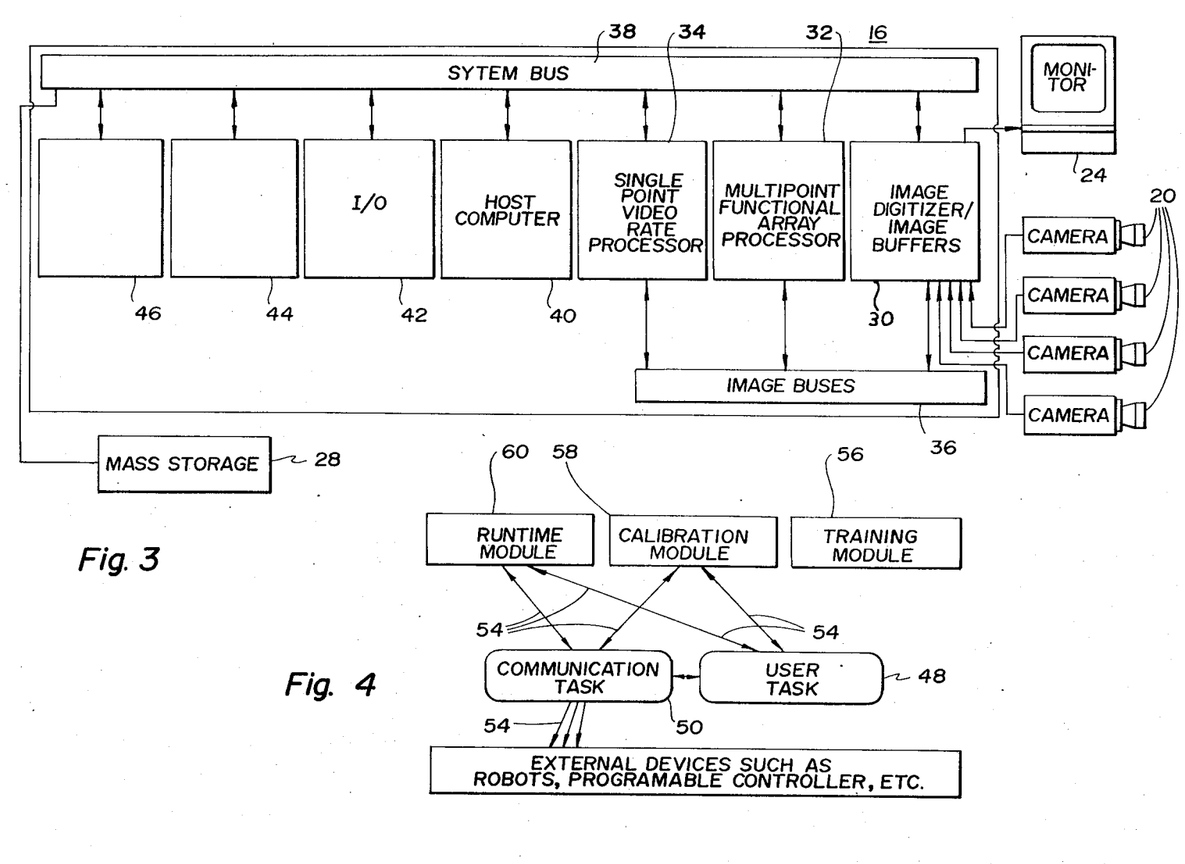
FIG. 3 is a schematic view of the hardware utilized in the subject system.
FIG. 4 is a schematic view of the software modules and tasks utilized with the hardware of FIG. 3 and the flow of data therebetween.

The hardware of a machine vision system constructed in accordance with the present invention is collectively indicated at 16 in FIGURE 3. The system 16 is intended, but not limited to be employed, at one or more vision or work stations, such as the vision station 18 in FIGURE 1. While illustrated mounted on the robot 10 at the vision station 18, the system 16 is capable of communicating with other peripheral devices such as programmable controllers, numerically controlled machinery, other vision systems, plant data management systems and the like. It is also to be understood that the system 16 may provide control functions for several vision or work stations by sharing its time between the vision stations.

The system 16 includes a plurality of cameras 20, one for each vision station 18. Each camera 20 preferably comprises a conventional solid-state televison camera which provides standard television output signals. However, it is to be understood that any standard RS-170 televison camera may be utilized.

Figure 2:
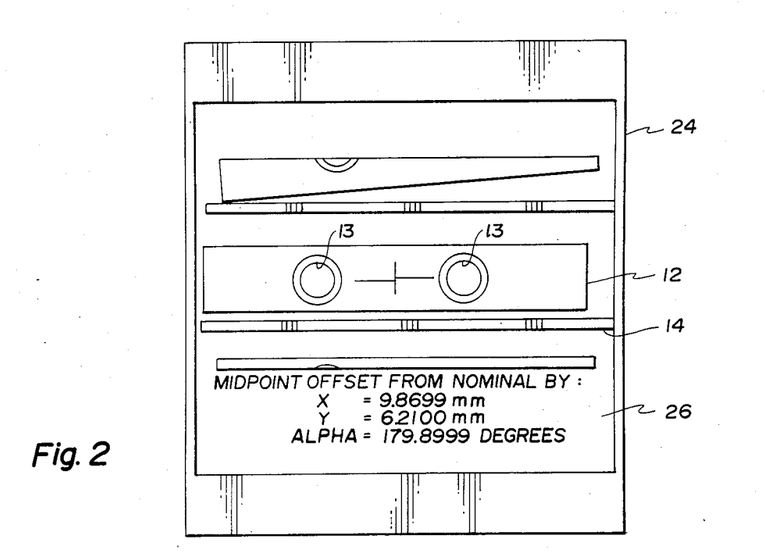
FIG. 2 is an enlarged, framed view of a scene appearing on a video monitor of the system illustrating the two-dimensional location of loosely constrained part in a tray.

As shown in FIG. 1, the camera 20 is positioned within a housing 22 mounted on the robot 10. The camera 20 generates an analogue image which contains within it an image of the object 12 as illustrated in FIG. 2. FIG. 2 is representative of the image generated by the camera 20 and displayed on a video monitor 24 of the system 16. It is to be understood that the camera 20 need not be mounted on the robot 10 but may be placed at a location fixed with respect to the robot 10.

The system 16 does not require any special lighting such as structured lighting. Relatively large variations in ambient lighting have a minimal effect on the accuracy of the system 16. However, artificial lighting is preferable if the camera 20 is located in extreme darkness such as might be encountered in a poorly illuminated area. Artificial lighting may also be desirable if the vision station 18 regularly experiences large changes in ambient light as might happen with direct sunlight. However, in both of the above-noted cases only a few, relatively low-cost light fixtures are necessary for a suitable lighting environment.

When the object 12 viewed by the system 16 is in a "0" offset or ideal, nominal position, there is associated with the camera 20, a camera or vision coordinate system or frame whose origin is located on or near the object 12. The vision coordinate system is assumed to remain fixed with respect to the viewing camera 20. The object 12 also has its own coordinate system which if fixed with respect to itself. When the object 12 is in its "0" offset position, the object coordinate system and the vision coordinate system are identical.

When the object 12 is moved from its "0" offset position the rigid body motion that it undergoes it fully defined by a transformation relating the vision coordinate system to the object coordinate system. This tranformation is defined with respect to the vision coordinate system and completely defines the position and orientation of the body coordinate system and, consequently, the location of the object 12.

Figure 9:
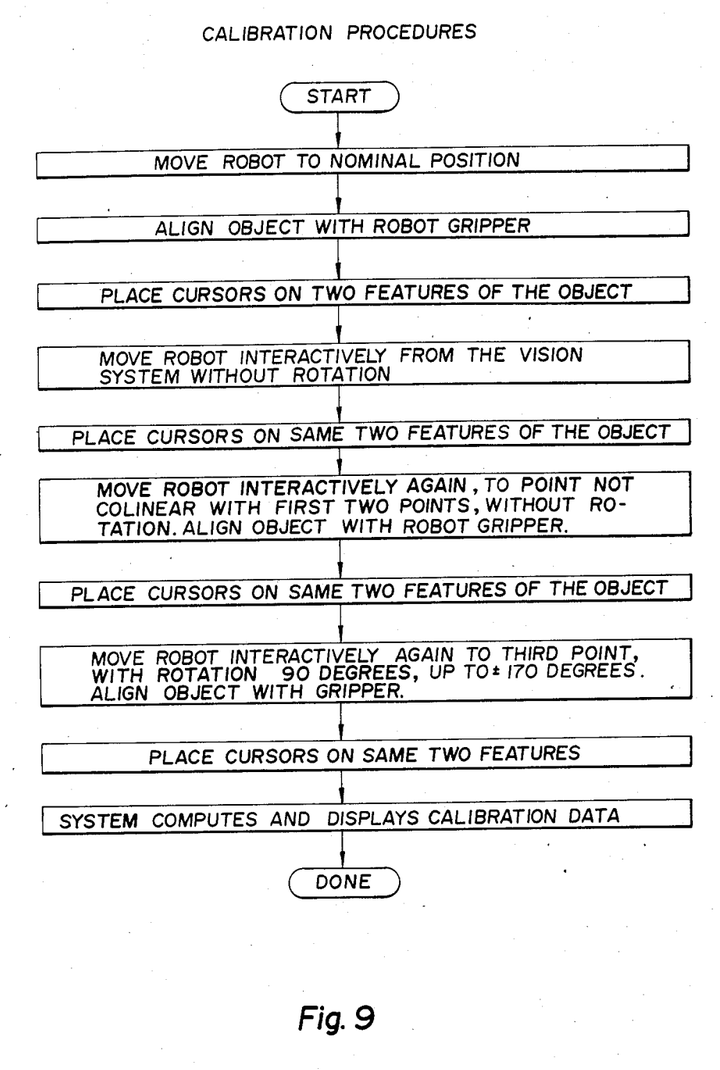
FIG. 9 is a software flowchart of a calibration module.

Numerical data describing the offset position of the object 12 is illustrated at location 26 on the video monitor 24 of FIG. 2. Calibration information relating to the various coordinate systems is generated and thereafter stored in a mass storage unit 28 of the system 16 as illustrated in FIG. 9. In particular, the user first places an ideal object in view of the camera 20. Then the user places cursors on various features such as edge segments of the ideal object. The robot 10 is then driven until it touches the ideal object at which time the robot position is recorded by the system 16. This same procedure is repeated until sufficient data is generated to calculate the various calibration parameters.

A more complete understanding of the interrelationship between the various coordinate systems and the mathematics which describe the relationship are both more fully described in the above-noted patent application.

The system 16 includes an image digitizer/image buffer, schematically indicated at 30 in FIG. 3. The image digitizer portion samples and digitizes the input image from the camera 20 and places it into a frame buffer preferably measuring approximately 256×240 picture elements, each of which consists of an 8-bit number representing the brightness of that spot in the image. However, it is to be understood that the image may be sampled to any other size, and with an image with more or fewer gray levels per pixel.

A second image buffer is used to store edge-enhanced images as they are generated and a third image buffer is used as an accumulator buffer. A fourth image buffer is provided for the shifting of the edge-enhanced images a predetermined number of pixels up, down, left or right. However, it is possible that the shift and add operations may be done in a single operation to eliminate the necessity for providing a fourth image buffer.

The system 16 also includes a multipoint, functional array processor which preferably comprises a systolic array processor 32 which, in one mode of operation, functions as a two-dimensional hardware convolver to perform a two-dimensional convolution. In another mode of operation, the array processor 32 performs image addition into the accumulator buffer and in a third mode of operation determines the location of the pixel having a maximum value in the accumulator buffer.

. The system 16 also includes a single point video rate processor 34 which is selectively coupled to the array processor 32 and the image digitizer/image buffers 30 by image busses 36 and a system bus 38. In one mode of operation, the video rate processor 34 performs a histogram to determine the value of the maximum pixel in the accumulator buffer. This value is subsequently passed via the system bus 38 to a host computer 40 for subsequent transmittal to the array processor 32. In turn, the array processor 32, as previously mentioned, determines the location of the maximum pixel found in the accumulator buffer.

In another mode of operation, the video rate processor 34 participates in the image digitization process, and also serves as a look-up table to provide a constant for reducing the intensity of the edge-enhanced images as will be described in greater detail hereinbelow.

The system 16 also includes input-output circuits 42 to allow the system 16 to communicate with external peripheral devices such as robots, programmable controllers, etc. The system 16 is adapted for expansion of its input-output functions as schematically illustrated at block 44 and also has capability for memory expansion as schematically illustrated at block 46.

The software of the system 16 is schematically illustrated in FIG. 4. The system software is preferably organized in five modules or tasks which perform the functions of vision, communication, training, calibration and runtime control as indicated by blocks 48, 50, 56, 58 and 60, respectively. Lines 54 represent the flow of data between the different tasks, modules and external devices.

Figure 6:
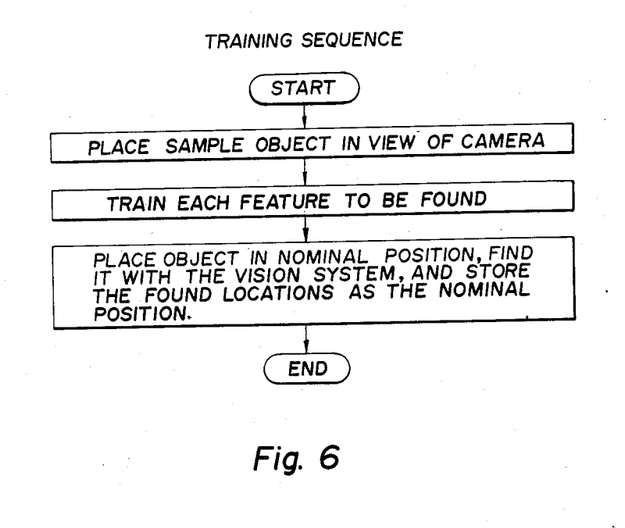
FIG. 6 is a software flowchart of a training module.

The user task 48 is specifically concerned with the handling of the offsets generated in response to requests from the peripheral device. The communication task 50 comprises an input-output interface which provides the other software with the capability to access external devices such as robots, programmable controllers, etc. as requested by the peripheral device. A detailed explanation of the calibration module 58 and the training module 56 are illustrated in FIGS. 9 and 6, respectively.

Figure 5:
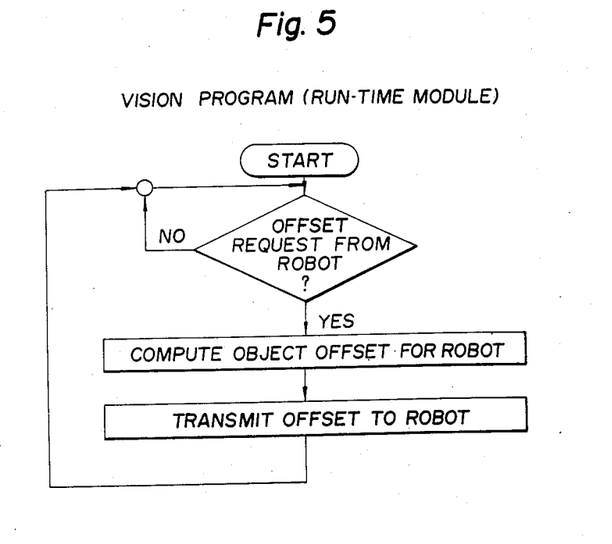
FIG. 5 is a software flowchart of a run time module.

Referring now to FIG. 5 there is illustrated in software flowchart form, the run time module 60. Briefly, the run time module 60 generates two-dimensional offsets for the object in the field of view of the camera 20.

Figure 10:
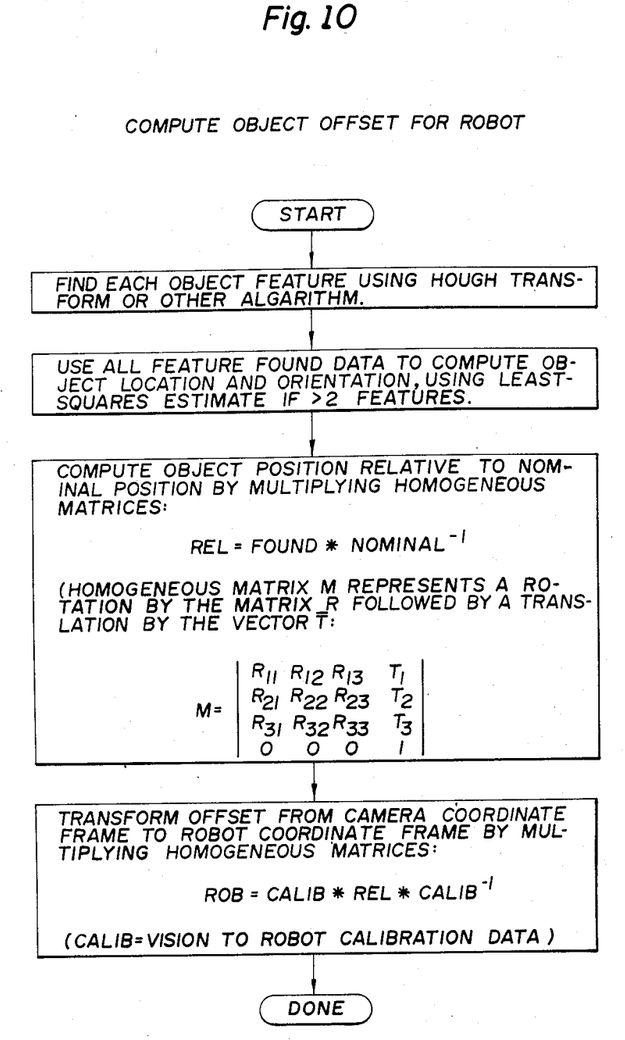
FIG. 10 is a software flowchart of a user task utilized in the run time module of FIG. 5.

Initially, the run time module 60 calls the user task 48, as illustrated in block diagram form in FIG. 10 which, in turn, calls an edge-detecting algorithm. Preferably, the algorithm comprises an implementation of the Hough transform as illustrated in block diagram form in FIG. 11. The Hough transform algorithm looks at the object 12 in the field of view of the camera 20 to find the image coodinates of certain geometric features of the object 12 such as holes 13 formed through the object 12. Then, the found features are displayed on the video monitor 24 as illustrated in FIG. 2. If more feature data is generated than is necessary, then a least-squares estimate routine is utilized to reduce the data. The image coordinates of the various found features and the previously generated calibration data are used to arrive at the offset location and orientation of the object 12.

Thereafter, as further illustrated in FIG. 10, the task 48 transforms the information into three degrees of freedom offsets from the previously measured nominal position (i.e. found during the training sequences of FIG. 6) of the object 12 by multiplying homogenous matrices. The task 48 then transforms the vision offsets into the frame of reference of a peripheral device, such as the robot 10, by utilizing the calibration data found during the calibration procedure of FIG. 9. Finally, the module 60 calls the communication task 50 to send the offsets to the controller of the robot 10 which is able to use the offsets to compensate its taught path to move to the object 12.

Figure 7:
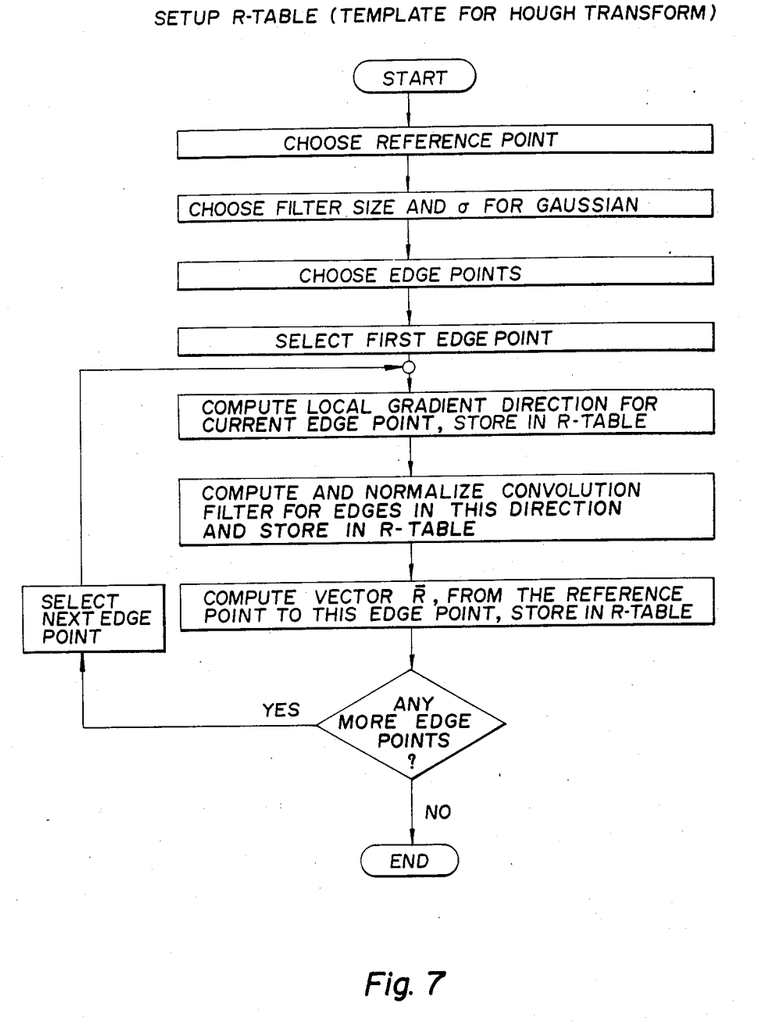
FIG. 7 is a flowchart illustrating the steps to form a template for use in the present invention.
Figure 8:
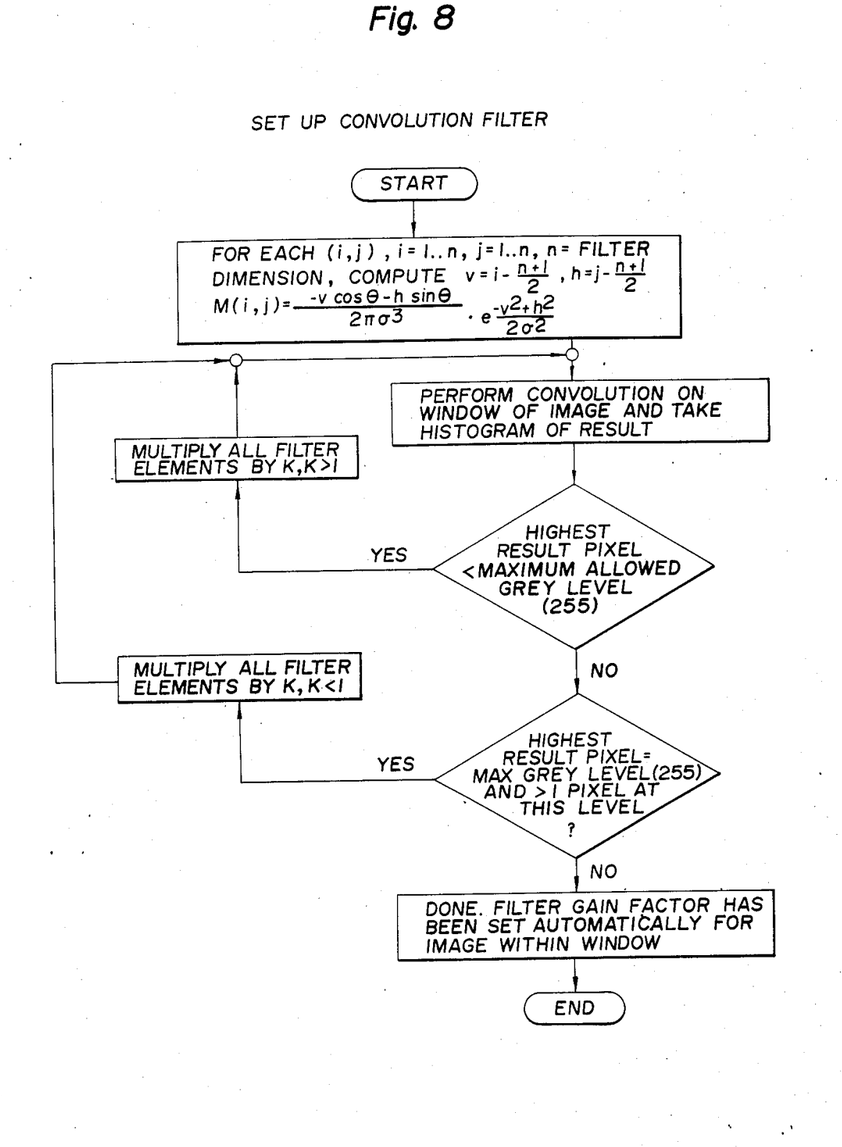
FIG. 8 is a flowchart illustrating the steps to set up a convolution mask for use in the subject invention.
Figure 11:
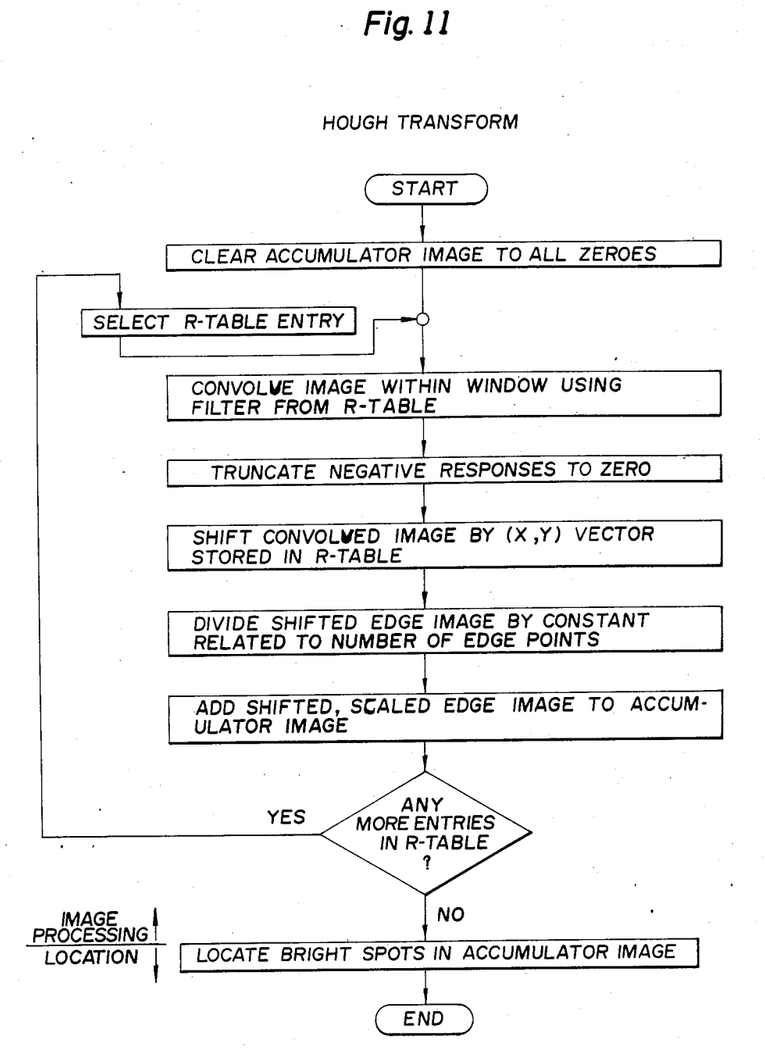
FIG. 11 is a software flowchart of an algorithm comprising an implementation of the Hough transform.

Referring now to FIGS. 7, 8 and 11, there is illustrated the Hough algorithm to find each predetermined feature of an object within the vision task 48. Briefly, the algorithm accepts as its input gray scale digitized image within which the desired feature or shape, called the template, is to be searched for. It produces a transformed image in which localized bright regions indicate the locations of copies of the template shape. The implementation of the Hough transform consists of performing a number of directional, edge-enhancement operations on the image; shifting the resulting edge-enhanced image by certain amounts in the horizontal and vertical directions; and summing the shifted images together in the accumulator buffer.

The Hough transform of the present invention as well as the generalized Hough transform algorithm is driven by a table called an "R-table" which is more fully described at pages 128 through 129 of the book entitled "Computer Vision", authored by Dana H. Ballard and Christopher M. Brown and published by Prentice Hall of Inglewood Cliffs, N.J. in 1982. The steps required to set up the R-Table are illustrated in FIG. 7. The first step in constructing the R-table is to choose a reference point in the template shape for which the Hough transform is to be constructed. The reference point can be arbitrary for purposes of the algorithm but when copies of the template pattern are found in the digitized image, it is the coordinates of this reference point which are found. The next step is to choose a number of points either on the perimeter or some internal edge of the template. Preferably, at least six such points are used. For each of these edge points, the local gradient direction of the image grey-level and the vector, R, to the reference point are computed and stored in the R-table.

Referring now to FIG. 11, there is illustrated in flowchart form the implementation of the Hough transform. First, all of the points in the two dimensional accumulator buffer are set to all zero. Second, for each entry in the R-table the following operations are performed: (1) a direction-sensitive, edge enhancement operation is performed on the input image with the direction of maximum response set to the direction from the R-table; (2) the edge-enhanced image is shifted spatially by the amount of the vector R from the R-table, and (3) each shifted edge-enhanced image is added to the accumulator buffer. When this procedure is repeated for all of the entries in the R table, the image in the accumulator buffer will have its highest value at the points where the template shape is located in the original image.

The edge-enhancement operation preferably utilizes the systolic array processor 32 to perform a two-dimensional convolution on the input image. By way of example, the convolution masks are square arrays of either $3 \times 3$, $5 \times 5$ or $7 \times 7$ coefficients each of which is preferably a 13-bit signed number which is programmable. The masks are chosen by sampling the first partial derivative in the direction given by theta of the bi-variate Gaussian probability distribution with zero mean and equal standard deviations along the two coordinate axes. The values of the standard deviation can be chosen over a wide range, but best results have been obtained with values of 0.85, 1.05 and 1.50 for the $3 \times 3$, $5 \times 5$ and $7 \times 7$ convolution masks, respectively.

Because the first directional derivative of the bi-variate Gaussian probability densing function is symmetric, the sum of the convolution mask coefficients is zero. The coefficients are all multiplied by a constant factor in order to make the sum of their squares equal to some given gain factor. This gain factor depends on the contrast of the input image and is automatically computed by software when the R-table is set up.

The convolution masks are preferably precomputed as illustrated in FIG. 8 for each gradient direction stored in the R-table since computing the convolution masks is a relatively slow operation involving floating point arithmetic. Consequently, when the algorithm is executed, the masks merely have to be retrieved from the R-table and passed to the hardware convolver (i.e. systolic array processor 32).

Response of image edges to convolutions with the first derivative of the Gaussian filter is strongest for edges aligned in the direction of te filter and falls off with the consine of the angle of misalignment. Edges that are plus or minus 90° from the desired direction thus give zero response and edges of opposite polarity give negative responses. As illustrated in FIG. 11, negative responses are set to zero. The use of such a direction-sensitive edge detector has a distinct advantage over the use of an isotropic one, such as the Lapacian, or gradient magnitude edge detectors in that far fewer undesired edges are generated. Such undesired edges may accidentally reinforce other edges to produce spurious peaks in the accumulator image.

Because there are only eight bits available for each number in the accumulator buffer, care must be taken not to exceed the maximum available when adding the shifted, edge-enhanced images together. On the other hand, the peaks in the accumulator buffer are preferably as bright as possible. Consequently, as illustrated in FIG. 8, the gain factors of the edge detecting filters are adjusted by software to give a response close to, but not exceeding, the maximum pixel value for the point in the image which gives the highest response. Second, as illustrated in FIG. 11, pixel intensities of the edge-enhanced image are divided by a constant by using an 8-bit-in, 8-bit-out lookup table residing in the video rate processor 34 before they are added to the image in the accumulator buffer. The constant used is the number of R-table points which are expected to coincide with a copy of the template pattern present in the image.

Once all of the shifted images have been added together in the accumulator buffer, the video rate processor 34 performs a histogram on the data therein to determine the value of the maximum pixel. This value is subsequently utilized by the systolic array processor 32 to determine the location of the maximum picture element which is related to the coordinates of the previously chosen reference point.

In identifying the location of circles and circular arcs, the R-table points are preferably equally spaced about the perimeter of the circle. Also, the edge-detector directions are all tangent to the circle and perpendicular to the shift vectors which are all radii of a circle having the reference point as its center. Because of this, the algorithm is insensitive to rotation of the input image, and, consequently, a part may be recognized and oriented merely by finding two or three holes or arcs with the algorithm.

The above-noted system and method is capable of examining and determining the position and attitude of an object at a vision station using a single camera without the need for special lighting. Object information can thereafter be communicated to any type of peripheral device, such as a robot. The gray scale machine vision system of the present invention does not require use of highly specialized or complex hardware and is robust (i.e. tolerates small variations in work pieces, camera adjustment and ambient light without significant degradation of system performance.) The system tolerates noisy, low-contrast images and is easily calibrated.

The invention has been described in an illustrative manner, and, it is to be understood that, the terminology whch has been used is intended to be in the nature of words of description rather than of limitation.

Obviously, many modifications and variations of the present invention are possible in light of the above teachings.

What is claimed is:

1. Method for automatically locating an object at a vision station, said method comprising the steps of:
   generating reference data relating to at least two features of an ideal object, the data including at least two edge points, one of said points being on each of a pair of non-parallel edge segments wherein the reference data includes directional data for each of the edge points;
   generating a gray-scale digital image containing the objects to be located at the vision station;
   processing the reference data and the dititl image together to obtain an accumulator image, said processing step including the steps of performing an edge-detecting convolution on at least a portion of the digital image for each edge point and shifting the convoluted data by an amount and in a direction related to the directional data for each of said edge points to obtain a shifted image;
   determining the location of at least one localized bright region in the accumulator image, the location of said region corresponding to the location of one of the features within the digital image.

2. Method of automatically generating offset data for use by a programmed robot controlled to enable a robot controlled by the controller to move to an object at the vision station including a camera, the offset data relating the position of the object to the coordinate frame of the robot, the method comprising the step of:
   generating calibration data relating the camera to the coordinate frame of the robot;
   generating reference data relating to at least two features of an ideal object, the data including at least two edge points one of said points being on each of a pair of non-parallel edge segments wherein the reference data includes directional data for each of the edge points;
   generating a gray-scale digital image containing the object to be located at the vision station;
   processing the reference data and the digital image together to obtain an accumulator image, said processing step including the steps of performing an edge-detecting convolution on at least a portion of the digital image for each edge point and shifting the convoluted data by an amount and in a direction related to the directional data for each of said edge points to obtain a shifted image;
   determining the location of at least one localized bright region in the accumulator image, the location of said region corresponding to the location of one of the features within the digital image;
   correlating the location of the features within the digital image of an offset of the object from the camera; and
   transforming the offset of the object from the camera to the robot frame.

3. The method as claimed in claim 1 or claim 2 wherein said processing step includes the step of summing the shifted convoluted data to obtain the accumulator image.

4. The method as claimed in claim 3 including the step of scaling the gray levels of the shifted image by an amount related to the number of edge points prior to said step of summing.

5. The method as claimed in claim 1 wherein the digital image is generated by a camera and further comprising the step of correlating the location of the features within the digital image to an offset of the object from the camera.

6. The method as claimed in claim 5 further comprising the steps of generating calibration data relating the coordinate frame of the camera to the coordinate frame of a peripheral device located at the vision station and transforming the offset of the object from the camera to the device frame.

7. The method as claimed in claim 1 or claim 2 wherein said edge segments are defined by entries in an R-table having a predetermined reference point and the edge points and wherein for each edge point entry there is defined a local gradient direction and a vector to the reference point.

8. A gray-scale vision system for automatically locating an object at a vision station comprising:
   means for storing reference data relating to at least two features of an ideal object, the data including at least two edge points one of said edge points being on each of a pair of non-parallel edge segments wherein the reference data includes directional data for each of the edge points;
   means for generating a gray-scale digital image containing the object to be located at the vision station, said means for generating including a television camera;

means for processing the reference data and the digital image together to obtain an accumulator image, said processing means including means for performing an edge-detecting convolution on at least a portion of the digital image for each edge point and shifting the convoluted data by an amount and in a direction related to the directional data for each of said edge points to obtain a shifted image; and means for determining the location of at least one localized bright region in the accumulator image, the location of said region corresponding to the location of one of the features within the digital image.

9. The system as claimed in claim 8 further comprising means for correlating the location of the features within the digital image to an offset of the object from the camera.

10. A system for automatically generating offset data for use by a programmed robot controller to enable a robot controlled by the controller to move to an object at a vision station, the offset data relating the position of the object to the coordinate frame of the robot, the system comprising:

means for storing reference data relating to at least two features of an ideal object, the data including at least two edge points, one of said edge points being on each of a pair of non-parallel edge segments wherein the reference data includes directional data for each of the edge points;

means for generating a gray-scale digital image containing the object to be located at the vision station, said means for generating including a television camera;

means for storing calibration data relating the camera to the coordinate frame of the robot;

means for processing the reference data and the digital image together to obtain an accumulator image, said processing means including means for performing an edge detecting convolution on at least a portion of the digital image for each edge point and shifting the convoluted data by an amount and in a direction related to the directional data for each of said edge points to obtain a shifted image;

means for determining the location of at least one localized bright region in the accumulator image, the location of said region corresponding to the location of one of the features within the digital image;

means for correlating the location of the features within the digital image to an offset of the object from the camera; and means for transforming the offset of the object from the camera to the robot frame.

11. The system as claimed in claims 8, 9 or 10 wherein said means for processing the reference data and the digital data includes a gray scale processor for performing each of the convolutions.

12. The system as claimed in claim 11 wherein at least one of said convolution is direction-sensitive and comprises a two-dimensional convolution of the digital image.

13. The system as claimed in claim 12 wherein said gray scale processor comprises a systolic array processor.

* * * * *